United States Patent
Dabrowski et al.

(10) Patent No.: US 12,187,029 B2
(45) Date of Patent: Jan. 7, 2025

(54) DEVICE AND METHOD FOR PERSONALIZING DOCUMENTS

(71) Applicant: Mühlbauer GmbH & Co. KG, Roding (DE)

(72) Inventors: Hubert Dabrowski, Chemnitz (DE); Uwe Kleindienst, St. Egidien (DE)

(73) Assignee: Muhlbauer GmbH & Co. KG, Roding (DE)

( * ) Notice: Subject to any disclaimer, the term of this patent is extended or adjusted under 35 U.S.C. 154(b) by 172 days.

(21) Appl. No.: 17/605,980

(22) PCT Filed: Apr. 23, 2020

(86) PCT No.: PCT/EP2020/061341
§ 371 (c)(1),
(2) Date: Oct. 22, 2021

(87) PCT Pub. No.: WO2020/216848
PCT Pub. Date: Oct. 29, 2020

(65) Prior Publication Data
US 2022/0212481 A1    Jul. 7, 2022

(30) Foreign Application Priority Data

Apr. 24, 2019   (DE) .......................... 102019205872.8

(51) Int. Cl.
| | |
|---|---|
| *B41J 3/28* | (2006.01) |
| *B41J 2/01* | (2006.01) |
| *B41J 13/00* | (2006.01) |
| *B41J 13/12* | (2006.01) |
| *B41J 13/26* | (2006.01) |

(52) U.S. Cl.
CPC ................ *B41J 13/12* (2013.01); *B41J 2/01* (2013.01); *B41J 3/28* (2013.01); *B41J 13/0009* (2013.01); *B41J 13/0063* (2013.01); *B41J 13/26* (2013.01)

(58) Field of Classification Search
CPC ..... B41J 3/28; B41J 2/01; B41J 13/009; B41J 13/0063; B41J 13/12; B41J 13/26
See application file for complete search history.

(56) References Cited

U.S. PATENT DOCUMENTS

2010/0006650 A1* 1/2010 Auboussier ...... G06K 19/07716
                                                                235/475
2011/0253871 A1* 10/2011 Bett ..................... B41J 3/40731
                                                                248/346.03

(Continued)

FOREIGN PATENT DOCUMENTS

| DE | 102006031024 A1 | 1/2008 |
| DE | 102006057830 A1 | 3/2008 |

(Continued)

OTHER PUBLICATIONS

International Searching Authority, Search Report and Written Opinion issued in PCT/EP2020/061341, mailed Aug. 10, 2020, 21 pages.

*Primary Examiner* — Justin Seo
*Assistant Examiner* — Kendrick X Liu
(74) *Attorney, Agent, or Firm* — Wood Herron & Evans LLP

(57) ABSTRACT

A device is provided for personalizing documents, which includes a personalization device for applying personalization information to a document to be personalized. In addition, the device has a conveying device which includes at least two movable document carrier devices, each of which is configured: to receive a document to be personalized at a transfer position of the device that is the same for all document carrier devices; to move the document received, into the operating region of the personalization device, for the purpose of being personalized; and to move the document received, after its personalization, back to the transfer position and to discharge it there. The conveying device is configured, during its operation, to convey each of (Continued)

the document carrier devices along a respective associated path curve in the shape of a closed loop between the transfer position, the operating region and, in turn, the transfer position.

26 Claims, 9 Drawing Sheets

(56) References Cited

U.S. PATENT DOCUMENTS

| | | | | |
|---|---|---|---|---|
| 2014/0268189 A1* | 9/2014 | Hunter | ............... | H04N 1/00278 |
| | | | | 358/1.5 |
| 2015/0137446 A1* | 5/2015 | Carlson | ................... | B41J 13/12 |
| | | | | 271/275 |
| 2018/0326763 A1* | 11/2018 | Wooldridge | ......... | B41J 11/0085 |

FOREIGN PATENT DOCUMENTS

| | | |
|---|---|---|
| DE | 102009050909 A1 | 4/2011 |
| DE | 102014203821 A1 | 9/2014 |
| EP | 1435587 A2 | 7/2004 |
| WO | 2007031856 A1 | 3/2007 |
| WO | WO-2007104854 A2 * 9/2007 | .......... B23K 26/032 |
| WO | 2015077218 A1 | 5/2015 |

* cited by examiner

DEVICE AND METHOD FOR PERSONALIZING DOCUMENTS

CROSS-REFERENCE TO RELATED APPLICATIONS

This application is a national phase entry of, and claims priority to, International Application No. PCT/EP2020/061341, filed Apr. 23, 2020 which claims priority to DE 10 2019 205 872.8, filed Apr. 24, 2019, both with the same title as listed above. The above-mentioned patent applications are incorporated herein by reference in their entireties.

TECHNICAL FIELD

This application relates to a device and a method for personalizing documents, such as, for example, identification documents in the shape of a card or a booklet.

BACKGROUND

A large number of different types of personalized documents, in particular in card form or booklet form, are known from the prior art. Thus, for example, booklet-like passport documents or individual pages thereof (for example the "passport holder page", as it is referred to), identity cards and many types of personalized chip cards, such as bank cards, credit cards, identity cards, membership cards, access authorization cards, etc., or personalized labels (usually in the form of a card) all belong to the group of personalized documents.

In this context, "personalization" or "personalized" means that the respective document contains or carries information that is typically associated with a holder of the document. Thus, for example, in some cases, the information may identify the holder, for example by the holder's name, an identity number or other features which are printed on the document, are applied to the document in some other way, or are stored in the document. In this context, the personalization may be individually related to a single person, or it may however also be related to a certain limited group of persons, for example employees of a company. In this context, the applying of the personalization information can be carried out by printing, by engraving or, in particular in the case of a plastics material surface, by targeted local change of color of the surface material of the document by the application of energy, in particular by a suitable laser.

In the published German patent application DE 10 2006 031 024 A1, a printing device and a method of applying printing to personalization documents are described. Here, the printing device comprises a printing unit for applying printing to a personalization document which is located in a printing area, and a feeding unit for successively feeding the personalization documents into the printing area. In this context, the feeding unit comprises a plurality of movable carrier devices for receiving a personalization document to which printing is to be applied and for moving it into the printing area and out of the printing area. The device further comprises a drive device for moving the carrier devices along a feed direction on different planes arranged perpendicularly to the feed direction. It further comprises a control unit for controlling the drive device so that the plurality of carrier devices are each moved alternately between a pick-up position, in which a personalization document is picked up, and the printing area. This is carried out in such a way that the drive device guides the plurality of carrier devices past each other on the different planes while moving in the feeding direction.

It would therefore be desirable to provide a device and a method with which the process for personalizing documents can be further improved, and with which the document throughput that can be achieved can be increased.

SUMMARY

To address these and other problems with conventional devices and methods, a device and a method for personalizing documents are provided. In a first embodiment, the device comprises a personalization device for applying personalization information to a document to be personalized, which document is located in an operating region of the personalization device, the personalization information being associated with the document to be personalized. The device further comprises a conveying device which comprises at least two movable document carrier devices, each of which is configured: (i) to receive a document to be personalized at a transfer position of the device that is the same for all document carrier devices; (ii) to move the document received, into the operating region of the personalization device, for the purpose of being personalized; and (iii) to move the document received, after its personalization, back to the transfer position and to discharge it there. In this context, the conveying device is configured, during its operation, to convey each of the document carrier devices along a respective associated path curve in the shape of a closed loop between the transfer position, the operating region and, in turn, the transfer position. In this context, the conveying movement of each of the individual document carrier devices along their path curve is carried out in a temporally staggered manner with respect to the respective conveying movement of each of the other document carrier devices in the same direction in such a way that the document carrier devices do not collide with each other during the course of their respective conveying movements along the path curve.

In this application, a "personalization device" is intended to be understood to mean a subsystem of the device for personalizing documents which is set up to apply personalization information to a document, which personalization information is associated with the document, during the processing of the document by the personalization device. For this purpose, the personalization device may comprise a printing device, for example an inkjet printer or a drop-on-demand printer (DoD printer), a marking laser or a programming head for writing personalization data to a data memory which is present in the document. In the case of printing, the personalization information may be applied to the document in monochrome or in color. Furthermore, it is possible that the personalization device comprises a combination of a printing device for applying ink, as well as an additional post-treatment device for the ink, in particular a source of ultraviolet light for curing UV-sensitive inks. Furthermore, the personalization device may, in addition or as an alternative, be arranged to apply a transparent ink or coating (for example "liquid coating"). Also, optionally, a plurality of personalization devices may be provided in the device for personalizing documents, in particular in such a manner that they process documents serially or in parallel. In some variants, different personalization devices may also carry out different method steps for this purpose, such as for example printing on the one hand and writing electronic data into a memory of the document on the other hand.

In this application, an "operating region" of the personalization device is accordingly intended to be understood to mean a spatial region on the personalization device, in the personalization device or in the vicinity of the personalization device in which the applying of the personalization information to the document takes place. In particular, this can be that spatial area in which, (i) in the case of printing, the printing ink is applied to the document, (ii) in the case of a laser treatment, the surface-changing effect of the laser on the document surface takes place, or (iii) in the case of programming, a transfer of data to a data memory which is present in the document takes place, for example by electrical contact, induction or short-range electromagnetic radiation.

In this application, a "document carrier device" is intended to be understood to mean a receiving device for a document to be personalized, which receiving device is provided for transferring the document into the operating region of the personalization device during the personalization process and for carrying the document during the course of this. For this purpose, the document carrier device can be configured (i) to carry the document in a tray-like manner, (ii) to receive the document at least partially in a cavity of the document carrier device, or (iii) to fix the document to, or in, the document carrier device by a fixing device, in each case in order to move the document along with the document carrier device as the latter is being moved.

In this application, a "path curve in the shape of a closed loop" is intended to be understood to mean a movement curve of finite length of an object, in this case of a document carrier device, in which the object, starting from a node location lying on the movement curve, returns to the node location after traversing the movement curve, which encloses a non-empty surface area, and thus connects the node location to itself by a closed loop which is defined by the movement curve. Thus, a mere back-and-forth movement from or to a node location, for example along a linear path, such as for example a rail or other linear guide, does not constitute a path curve in the shape of a closed loop in the sense of the invention.

The conveying movements of the document carrier devices are "in the same direction" in the sense of the invention if, in the course of these conveying movements, when viewed laterally from the same point of observation, the respective associated document carrier devices traverse their respective path curves in the shape of a loop in the same direction of travel, i.e. in a clockwise direction or in a counterclockwise direction.

In such a device in accordance with the invention, several documents, which are carried by different document carriers and therefore follow their respective path curves during operation of the device, can thus be processed at the same time, whereby they each pass through a different region of the device at the same time, which makes a parallelization of several process steps possible. In particular, this makes it possible to further increase the throughput of the device during the personalization of the documents. In particular, the sequence of movements of the document carriers determined by the device also does not rely on empty runs of document carriers, at least in the case of a continuous feeding of documents to be personalized, which also contributes towards an increase in the throughput that can be achieved.

The design of the path curves in the shape of a loop and the conveying movements in the same direction also contribute towards a technique in which time-consuming reversals of the direction of movement during the course of the movement of the documents, which reversals of the direction of movement, at the desired high throughput rates, are associated with high accelerations, can be avoided, which can also contribute towards an increase in the throughput and which can additionally contribute towards avoiding an acceleration-dependent misalignment of the documents, and can thus contribute towards quality assurance.

Furthermore, the device allows the personalization device to be provided in a stationary position and instead only to move, by the movable document carrier devices, the documents to be personalized in order to feed them to the personalization device and/or to convey them away from the personalization device after the personalization. In this way, the risk of misalignment or even damage to the personalization devices, which are often very sensitive, such as for example print heads, as in the case of alternative devices in which the personalization device or parts thereof have to be moved, can effectively be counteracted.

In the following, preferred embodiments of the device will be described, each of which, as far as this is not expressly excluded or technically impossible, can be combined with one another in any desired manner and which can equally be applied in a corresponding manner to the method in accordance with the second embodiment of the invention, which is described subsequently.

In accordance with some embodiments, the device further comprises a transport device which is arranged to feed a document to be personalized to the transfer position along a transport path, for receiving the same by one of the document carrier devices, and to convey, away from the transfer position, a document which has already been personalized by the personalization device and which has been discharged at the transfer position by one of the document carrier devices. In this way, the device is able to manage with a single transfer position at which the picking up of the documents by the respective associated document carrier device as well as the subsequent discharging of the corresponding document after its personalization take place. This not only provides the advantage that a particularly compact construction is made possible, but it also makes it possible to avoid empty runs of the document carrier devices, since a document carrier device which has just been unloaded can be loaded with a further document immediately afterwards at the same spot without any intervening conveying movement. This also serves to increase the achievable throughput. In addition, in comparison with the teaching of German Patent Application DE 10 2006 031 024 A1, the need for separate loading or unloading units provided in addition to the document carrier devices is eliminated, since the document carrier devices are loaded with the documents directly from the transport device and/or since the document carrier devices unload the documents onto the transport device after the documents have been processed.

In accordance with some embodiments, the construction of the device described above may be implemented in such a way that the conveying device comprises a respective conveying unit on both sides of the transport path for conveying at least one of the document carrier devices along their respective path curve. Among other things, this makes a decoupled movement of the various document carrier devices possible, in particular in the case of only two document carrier devices, which increases the flexibility of the device. In particular, such a solution also makes it possible, in the event of unscheduled delays occurring during the course of the personalization, to react flexibly to this by appropriate individual control of the individual conveying units, in order to be able to ensure the continuous operation of the device and thus the desired high throughput and, in addition, to avoid a collision of the document carrier devices during their respective conveying movements.

In accordance with some embodiments, the device is further configured to carry out the respective conveying movements of the document carrier devices along their respective path curves in such a way that an intermediate stop takes place at least at the transfer position. This has the advantage that the loading and the unloading of the document carrier devices at the transfer position can be carried out while the document carrier device is stationary, which simplifies the complexity of the implementation of the loading and unloading operations and which can contribute towards an increased reliability of these operations and thus of the operation of the device as a whole.

In accordance with some embodiments, the time offset of the movements of the document carrier devices along their respective path curve is determined in such a way that, at the point in time at which one of the document carrier devices is located at the transfer position, another one of the document carrier devices is at the same time located in the operating region of the personalization device. In this way, a simultaneous process control is made possible in the sense that a personalization of a document which is carried by a document carrier device, as well as an unloading by a subsequent reloading of another one of the document carrier devices with a further document, can be carried out at the same time, which also contributes towards an increase in the achievable throughput of the device.

In particular, in accordance with a further development of this, the device can be configured in such a way that, at a point in time or during a period of time at which, or during which, one of the document carrier devices is located at the transfer position and another one of the document carrier devices is located in the operating region of the personalization device, this other document carrier device also makes an intermediate stop in the operating region. This can be useful if the personalization device is constructed in such a way that a personalization when the document to be personalized is stationary is advantageous over a personalization while the document is moving, for example in order to avoid a possible degradation in quality.

In accordance with some embodiments, the device is further configured, when one of the document carrier devices is located at the transfer position, to discharge a document which is currently carried by that document carrier device and which has already previously been personalized by the personalization device, and, in its place, to pick up, by that document carrier device, a further document yet to be personalized by the personalization device before that document carrier device continues its movement for a new traversal of its path curve. In this way, the document carrier device is both unloaded and loaded again at the same spot at the transfer position, without an empty run of the document carrier device taking place and/or without there being a need for an empty run in between. Thus, a further increase in the throughput of the device can be achieved, since in this way the proportion of the respective path curve of the document carrier devices, along which they are not loaded with a document for its processing, can be minimized and can be reduced to zero.

In accordance with some embodiments, the path curve of at least one of the document carrier devices is determined in such a way that, during operation of the device, this path curve has a curve portion between the transfer position and a first intermediate position which curve portion is traversed twice per traversal of the path curve, wherein this curve portion is traversed, on the one hand, in the course of an away movement of this document carrier device from the transfer position to the first intermediate position and, on the other hand, offset in time with respect thereto and in the opposite direction in the course of a toward movement of the document carrier device from the first intermediate position to the transfer position, during the traversal, in the same direction, of the path curve in the shape of a loop by this document carrier device. With the aid of these embodiments, in particular the movement of the document carrier devices along the curve portion traversed twice can be configured, in particular also configured in a variable manner, with regard to the direction and the speed of the movement, in such a way that undesired interactions between the document carrier device and the transport device in the region of the transfer position can be minimized or can be eliminated completely. In this way, in particular an undesired collision of the moving document carrier device with the transport device can be avoided in a simple manner. To this end, for example, the speed of movement of the document carrier device in the curve portion can be reduced with respect to the speed of movement in the remaining part of the path curve, in particular with respect to the speed of movement on the return path from the personalization device, and/or a perpendicular approach of the document carrier devices to the transport device can be envisaged in order to exclude tangential components of movement, which could lead to damage.

In some further developments of these embodiments, the path curve of the at least one document carrier device further comprises a second intermediate position which is located between the operating region and the first intermediate position, and the device is further configured to carry out a movement of a first one of the document carrier devices, which movement takes place in the course of the away movement from the transfer position along the curve portion, with a time offset before a movement of a directly following second one of the document carrier devices in the course of the toward movement from the second intermediate position via the first intermediate position to the transfer position, in such a way that, in this context, the second document carrier device cannot reach the first intermediate position until the first document carrier device has already left the first intermediate position again. In particular, the second intermediate position can, for this purpose, be provided as a stop position at which the movement of the second document carrier device is stopped or slowed down in order to ensure that the second document carrier device can only reach the first intermediate position when the preceding first document carrier device has already left the first intermediate position in the course of its movement away from the transfer position. In this way, in accordance with these embodiments, collisions between the document carrier devices can be avoided despite the common path portion of the movements of the document carrier devices in the region of the curve portion lying between the first intermediate position and the transfer position, in particular even in the event of unforeseen delays in the movement sequence of one or more of the document carrier devices.

In accordance with some embodiments, the device is configured to carry out the conveying movements of the document carrier devices in a clocked manner in accordance with a common system clock, wherein each path curve is subdivided into at least three path portions and one or two successive path portions are traversed per individual clock cycle of the system clock. This also helps to avoid collisions of the individual document carrier devices, since the time offsets of the movements of the document carrier devices along their path curves can be determined by a suitable assignment of the individual path portions to the system clock in a clock-related manner in such a way that, at any given point in time, the various document carrier devices are always located in different path portions which do not collide.

In accordance with some embodiments, the device is further configured to carry out the conveying movements of the document carrier devices along their respective path curve in a periodical manner, so that the conveying movements of the various document carrier devices, which conveying movements are offset in time, are out of phase with each other. In this way, a particularly simple and robust mode of operation of the device can be realized. In particular, these embodiments can also be combined with the clock cycle-based embodiments mentioned above, so that each of the periodic conveying movements of the individual document carrier devices can be subdivided into different partial movements respectively taking place during a cycle.

In accordance with some embodiments, the device is further configured in such a way that the path curves of at least two of the document carrier devices, preferably of all of the document carrier devices, coincide in the operating region, so that the personalization of documents carried by these document carrier devices takes place at the same location or in the same local area within the operating region of the personalization device. This thus includes the case where the path curves do not coincide everywhere, but at least in the operating region. An advantage of these embodiments resides in the fact that the personalization device can be constructed in a particularly simple and compact manner, since it is not necessary to take into account different path curves in the operating region.

In accordance with some of these embodiments, the device is further configured in such a way that the path curves of at least two of the document carrier devices, preferably of all of the document carrier devices, coincide in their entirety, at least substantially. This serves to further simplify the device, since fewer path curves now need to be implemented, and ideally only a single path curve needs to be implemented, which all of the document carrier devices traverse in the same direction, and they do this with a time delay. In particular, it then also follows that the personalization of the documents in the operating region of the personalization device always takes place at the same location or the same local area within the operating region. In total, a particularly simple and compact construction of the device can thus be achieved and its complexity can be further reduced.

In accordance with some embodiments, the path curve of at least one of the document carrier devices is defined in such a way that, in the course of the operation of the device, this path curve has a curve portion which is traversed several times per traversal of the path curve and which runs through the operating region, wherein a respective personalization of a document picked up by the document carrier device is carried out by the personalization device during at least two of these traversals of the curve portion during one and the same traversal of the path curve while the document carrier device is located in the operating region. In this way, a plurality of personalization processes can take place per traversal of the path curve, which makes more complex personalization actions by different personalization processes possible, or which makes more complex personalization actions possible which involve the formation of overlapping instances of personalization per document.

In accordance with some embodiments, the device further comprises an inspection device which is located along the respective path curves of the document carrier devices and upstream of the respective operating region of the personalization device, the inspection device being provided for detecting the position of a document picked up by a document carrier device with respect to this document carrier device and for determining and transmitting at least one position parameter which characterizes this position. In this context, the personalization device is configured to carry out a self-calibration on the basis of this at least one position parameter in order to compensate for any deviations in the alignment between the document and the personalization device as determined on the basis of the at least one position parameter, in order subsequently to apply, on the basis of this self-calibration, a personalization to the document irrespective of its relative position with respect to the document carrier device carrying it. These measures serve to improve the quality with regard to a correctly aligned application or introduction of a personalization onto or into the document. In particular, it is therefore possible to dispense with special measures for aligning the document with respect to the personalization device or the document carrier device, or to make them less precise, since any alignment correction that may still be required can be carried out by the self-calibration mentioned above.

Specifically, in accordance with some embodiments based thereon, the personalization device may further be configured (i) to personalize the document by applying printing to it; and (ii) to carry out, within the framework of the self-calibration, an adjustment of a target print layout for a personalization to be applied to the document by printing thereon, by a transformation which is dependent on the at least one position parameter, into an actual position-compensated print layout to be printed.

Also, in accordance with further embodiments, the personalization device may further be configured (i) to personalize the document by laser treatment; and (ii) to carry out, within the framework of the self-calibration, an adjustment of a target laser treatment layout for a personalization to be applied to the document by the laser treatment, by a transformation which is dependent on the at least one position parameter, into an actual position-compensated laser treatment layout to be generated.

In accordance with some embodiments, at least one of the document carrier devices comprises a fixing device for fixing a document carried by said document carrier device during the traversal of its path curve. In this way, it can be achieved that the document maintains its position relative to the document carrier device during its joint movement with the document carrier device carrying it, even when changes in direction or other accelerations occur. Consequently, on the one hand, this means that it is firmly connected to the document carrier device so that it can follow its path curve. On the other hand, however, this also means that the position, in particular the orientation, of the document relative to the document carrier device can be fixed, which in turn, in an advantageous manner, enables a fixed orientation relative to the personalization device and thus quality assurance with regard to the personalization of the document to be achieved.

In accordance with some further developments to this, the document carrier device has a cavity for at least partially receiving the document. In this context, the fixing device is additionally constructed in the form of a clamping device which is configured in such a way that, in operation, for the purpose of fixing the document in the cavity, it temporarily applies a pressure to the document at least from one side in order to press the document against an opposite inner wall of the cavity and thereby to fix it. In this way, the document can be securely carried along and fixed in the document carrier device even in view of the high accelerations which are associated with high throughput rates.

To this end, in accordance with some variants, the clamping device may be configured to provide the pressure for temporarily applying pressure to the document for the purpose of fixing it in place by pneumatic means. In some of these variants, the clamping device comprises for this purpose a pneumatic pressure chamber which is configured (i) to be filled at the transfer position under pressure and (ii) while the associated document carrier device traverses the path curve outside the transfer position, to apply pneumatic pressure to the document for the purpose of fixing it by the clamping device, without external supply of pneumatic pressure. Such an implementation has the advantage that the fixing of the document in the document carrier device, which is movable along its path curve, can be maintained in an autonomous manner without there being a need to supply pressure from outside the document carrier device for this purpose, for example by a supply of pressure through pneumatic hoses.

In accordance with some other variants, the clamping device (10; 10a, 10b) may be coupled to a fixing device (20) provided as part of the document carrier device, which fixing device (20) is configured to releasably lock the position of the clamping device (10; 10a, 10b) when the latter is pressed onto the document (D) under pressure in order to fix the document (D). This allows particularly short dwell times at the transfer position and thus a particularly high throughput to be achieved.

In accordance with some embodiments, at least one of the document carrier devices comprises an alignment device for aligning a document which has been picked up by this document carrier device in accordance with a predetermined target alignment. For this purpose, the alignment device may comprise one or more centering pins, in particular one or more movable centering pins, which are arranged to align the document in accordance with the desired alignment relative to the document carrier device carrying it, in particular in the sense of a centering action. These embodiments can be used instead of, or else in addition to, the aforementioned solution by self-calibration, for example in order to bring about a coarse alignment of the document before a more precise self-calibration. Such an alignment in turn serves for quality assurance with regard to an aligned application or introduction of a personalization onto or into the document to be personalized.

In accordance with some embodiments, the device further comprises: (i) a control device for controlling the device, and (ii) a sensor device which is configured to detect, at one or more particular points along the respective path curves, one or more current movement parameters of the document carrier devices and to communicate these to the control device. In this context, the control device is configured to control the device as a function of these respective movement parameters. In particular, the movement parameters may relate to a position, speed, acceleration or direction of movement of the document carrier unit, in particular to a time-dependent position, speed, acceleration or direction of movement of the document carrier unit, or to a combination of two or more of the movement parameters mentioned above and may serve, in particular, to monitor the fault-free operation of the device. Further, this sensor device, or optionally a further sensor device, can be provided for monitoring, in a sensor-based manner, the loading of the document carrier devices with documents and/or the subsequent unloading of the documents, in particular with regard to the detection of any malfunctions.

In accordance with some embodiments based thereon, the conveying device is arranged to vary the path curve of at least one of the document carrier devices as a function of a corresponding control by the control device on the basis of the movement parameters. In this context, in particular the length of individual portions of the path curve can be varied. In an example of a variant to this, such a portion can be designed, as a function of the control which is based on the movement parameters, in particular as a straight path curve or else as a path curve of greater length in the shape of an arc. In this way, fluctuations in the movement sequence or undesirable phase shifts between the movements of the individual document carrier devices, in particular temporarily occurring fluctuations in the movement sequence or undesirable phase shifts between the movements of the individual document carrier devices, can be corrected during ongoing operation, in particular with the path speed remaining constant, in order to return to an error-free operation in this manner.

In accordance with some embodiments, at least one of the document carrier devices has a housing in which there is a cavity in order to at least partially receive the document, wherein the housing has at least one housing recess which is configured in such a way that a personalization of the document by the personalization device is possible through the at least one housing recess when the document is located in the operating region. In this way, a particularly stable fixing of the document in the document carrier device can be achieved, as well as, at the same time, a personalization of the document, in particular printing on the document, through this housing recess, which personalization of the document, in particular printing on the document, is not impaired by this. Other process steps in relation to the document can also be carried out in the same way through this housing recess, for example laser treatment processes or magnetization processes.

In this context, in accordance with some of these embodiments, the housing has at least two housing recesses which are adjacent to one another and which are separated from one another by an intermediate web. Each of these housing recesses is configured in such a way that a personalization, by the personalization device, of a part of the document exposed by the respective housing recess, in particular in each case a page of multi-page document bound in a manner similar to a booklet, is made possible through the housing recesses when the document is located in the operating region. The intermediate web serves as a guiding element guiding the document when the document is being picked up or discharged at the transfer position, as well as for holding down portions of the document and thus for additionally fixing the document while it is located in the cavity of the housing, such as during the personalization of the document in the operating region by the personalization device, as well as during transport thereto and back to the transfer position.

In accordance with some embodiments, in which at least one of the document carrier devices comprises a housing in which a cavity for at least partially receiving the document is located, the device further comprises a hold-down device which is configured to apply temporarily, when the document carrier device is located at the transfer position, a guiding force to the document through the at least one housing recess thereof in order to hold down the document at least in some places while it is being received into, or discharged from, the cavity of the housing. In this way, in particular a catching of the document on one or more edges of the at least one housing recess can be counteracted in order to support a picking up and discharging of the document at the transfer position without malfunctions.

A second embodiment of the invention relates to a method of personalizing documents. The method comprises: (i) picking up a document to be personalized by one of a plurality of document carrier devices of a device for personalizing documents, wherein the picking up takes place at a transfer position of the device which is the same for all document carrier devices; (ii) conveying the document carrier device with the document picked up by the document carrier device into the operating region of a personalization device of the device for the purpose of personalizing the document; (iii) applying, to the document, when it is located in the operating region of the personalization device, personalization information associated with the document; (iv) and conveying the document carrier device with the document picked up by the document carrier device back to the transfer position after it has been personalized, in order to discharge it there from the document carrier device, while a further one of the document carrier devices with a further document picked up by the further document carrier device is already traversing its path curve for the purpose of personalizing this further document. In this context, each of the document carrier devices is respectively conveyed along a respective associated path curve in the shape of a closed loop between the transfer position, the operating region and, in turn, the transfer position. In addition, the conveying movement of each of the individual document carrier devices along their path curve is carried out in a temporally staggered manner with respect to the respective conveying movement of each of the other document carrier devices in the same direction in such a way that the document carrier devices do not collide with each other during the course of their respective conveying movements along the path curve.

This method thus corresponds to the device which has been described in the context of the first embodiment of the invention, so that the advantages, embodiments and/or further developments mentioned in that context can equally be applied to the method in accordance with the second embodiment of the invention.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

In the figures, the same reference signs are used throughout for the same or for mutually corresponding elements of the invention, except for the designations of the path portions.

Figure 1:
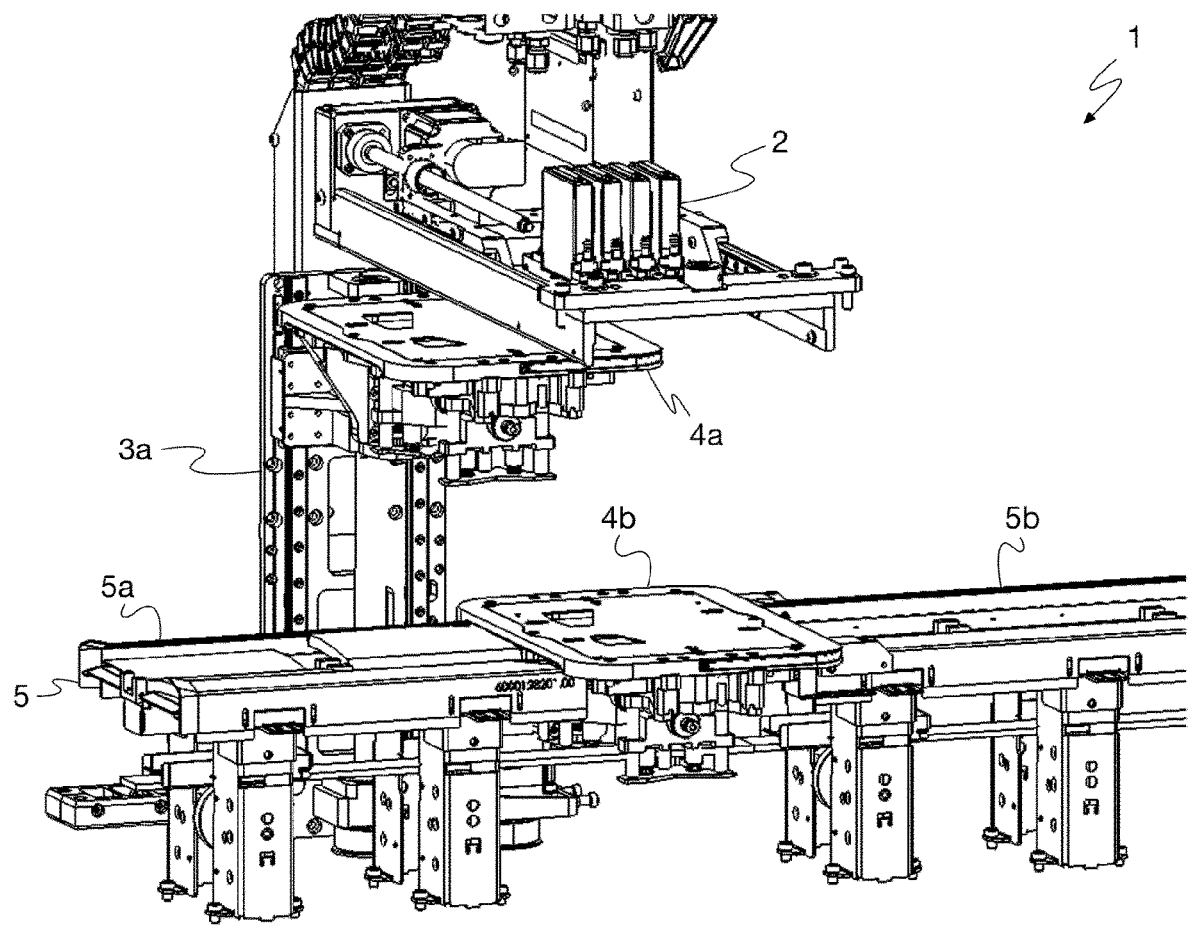
FIG. 1 is a lateral perspective view of a device in accordance with an example embodiment, in which two document carrier devices are provided.

FIG. 1 shows, in a lateral perspective view, a device 1 in accordance with an example embodiment of the invention, in which two document carrier devices 4a and 4b are provided, but without this number being intended to be understood as a limitation. Other embodiments may also have more than two document carrier devices, for example three or four document carrier devices. A conveying unit is associated with each of the document carrier devices 4a and 4b of the device 1, with the aid of which conveying unit the respective document carrier device 4a or 4b can be conveyed at least in two spatial dimensions, that is, in a height-wise direction as well as along a horizontal direction which is defined by a transport device 5 of the device 1. For reasons of clarity, only one of the conveying units is illustrated in FIG. 1, and that is the conveying unit 3a, which is associated with the first document carrier device 4a. The conveying units together form a conveying device for the document carrier devices 4a and 4b.

In addition, the device 1 comprises a personalization device 2 for personalizing documents. For this purpose, the device 1 is arranged: (i) to receive, in each of the document carrier devices 4a, 4b, a document D from a first transport path portion 5a of the transport device 5, which first transport path portion 5a serves to feed documents, (ii) to convey, with the aid of a corresponding conveying movement of the respective associated document carrier device 4a or 4b, the document D into an operating region 2a of the personalization device 2, which carries out a personalization of the document D in the operating region 2a, for example by printing, engraving, surface modification or programming with data, and (iii) subsequently to convey the document D back to the transport device 5. There, the document D is then discharged to a second transport path portion 5b of the transport device 5 in order to be transported away. The loading and/or unloading of the document D into, and/or from, the corresponding document carrier device 4a, 4b takes place at a position of the path curve which is located on the transport path 5, and which is referred to herein as transfer position 6.

Figure 2:
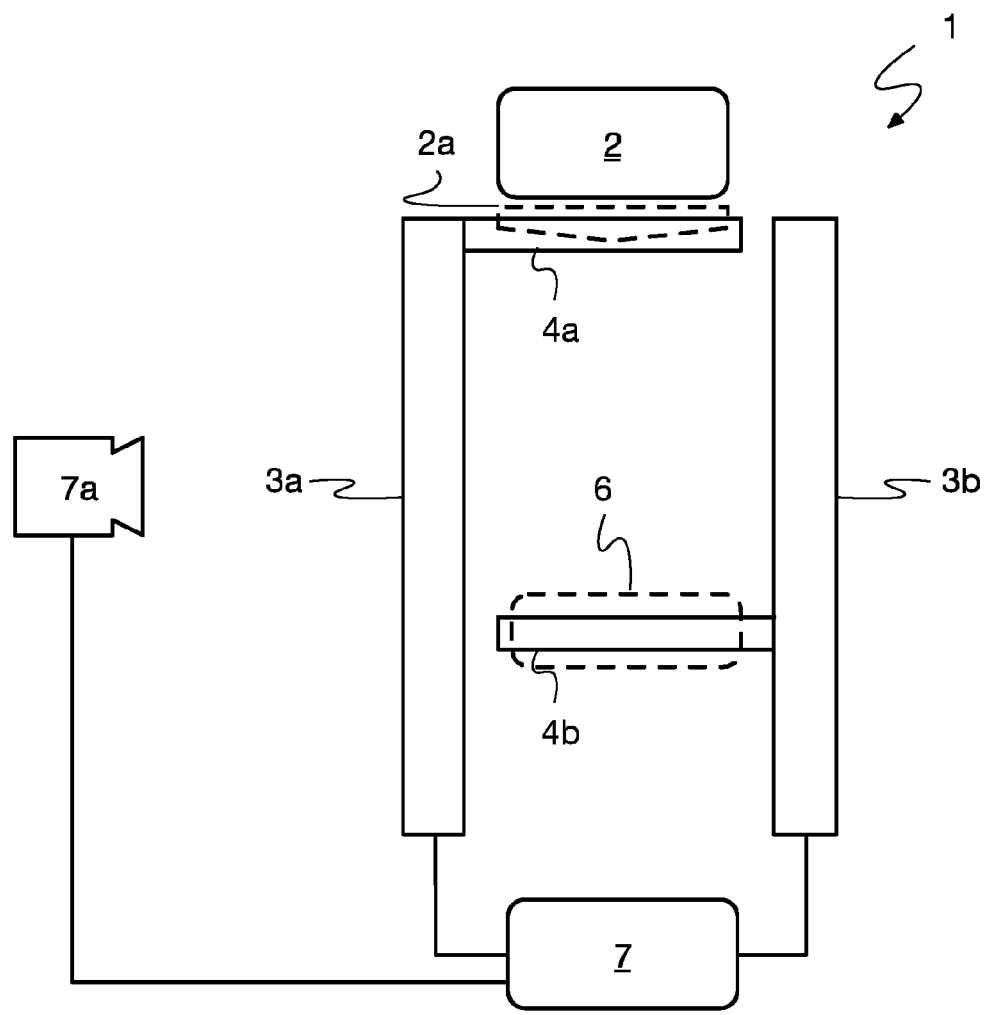
FIG. 2 is a schematic representation of the drive device together with a control device, in each case of the device of FIG. 1.

FIG. 2 shows, for clearer illustration, a side view of the device 1 (in parts) along the viewing direction determined by the course of the transport device 5 at an example point in time at which the first document carrier device 4a has reached its maximum height in its path curve defined by the conveying movement, while at the same time the second document carrier device 4b has correspondingly reached its minimum height. The course of the path curve in accordance with various embodiments will be explained in the following with reference to FIGS. 4 to 6.

In the representation in FIG. 2, both conveying units 3a as well as 3b are shown, each of which is located on a side of the transport device 5 which is opposite the other document carrier device, which transport device 5, in the representation in FIG. 2, runs perpendicular with respect to the drawing plane through the transfer position 6. For its control, the device 1 further comprises a control device 7 which is used to control the conveying units 3a and 3b and thus to control the movement of the document carrier devices 4a, 4b. In the sense of the invention, the term "control" can be understood not only as control, but also as feedback control in the sense of open-loop and closed-loop control technology. For this purpose, in particular movement parameters can be used as input variables which are supplied by a sensor device 7a of the device 1, which sensor device 7a is set up for the detection, in a sensor-based manner, of movement parameters of the movements of the document carrier devices along their path curves.

Figure 3A:
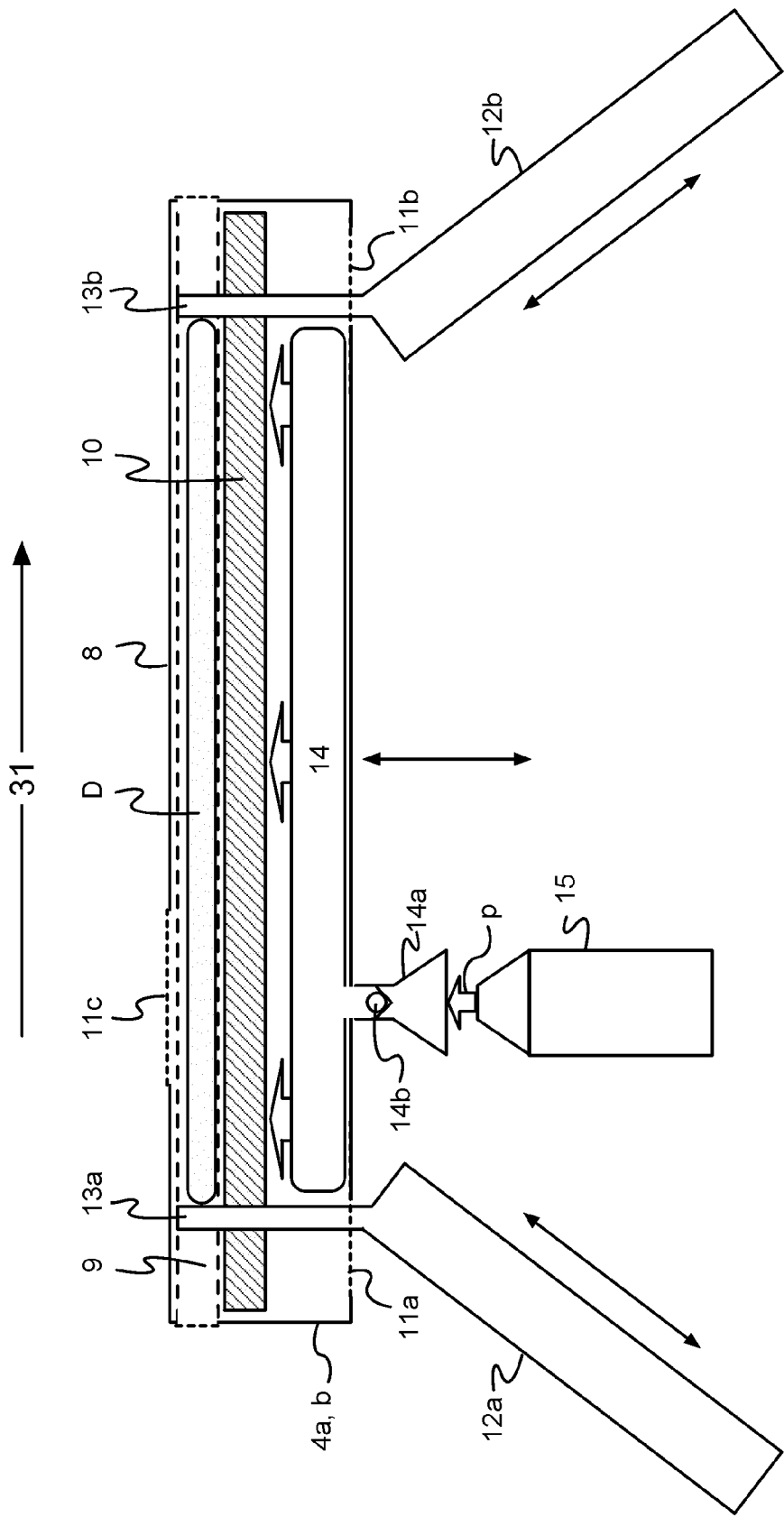
FIG. 3A is a schematic representation of a document carrier device of the device of FIG. 1, as well as a fixing device of the device in accordance with a first example embodiment.

FIG. 3A schematically illustrates a document carrier device 4a and/or 4b of the device of FIG. 1, as well as an example of a fixing device for this, in accordance with a first example embodiment thereof, in a sectional view, in which the viewing direction runs perpendicular to the transport direction 31, along which the documents D are transported by the transport device 5 to, and/or from, the transfer position 6. In this embodiment, the document carrier device 4a or 4b comprises a housing 8 in which, among other things, a cavity 9 which is constructed in the form of a document tray is located, which is designed to receive a document D to be personalized.

Further, at least one pressing element 10 is provided in the housing 8, which pressing element 10 is for example constructed in the form of a pressing plate, which pressing element 10 can be acted upon by pressure from a pressure chamber 14, which is also located in the housing 8, in order thereby to be moved, under pressure, in the direction of the document tray 9. In this way, a document D located in the document tray 9 can be pressed against the opposite inner wall of the housing 8 (in FIG. 3, this is the upper inner wall) and thus fixed in the document carrier device 4a and/or 4b.

For this purpose, the pressure chamber 14 can be filled by a pressurized gas, in the present example air, via a gas inlet or air inlet 14a, in particular at a point in time and/or at a position of the device 1 at which the document carrier device 4a or 4b is in the transfer position 6. When reference is made herein to air or pneumatics, this is to be understood as being limited to air or compressed air respectively. In fact, other suitable gases or gas mixtures may equally be used as well, such as for example nitrogen.

For filling the pressure chamber with compressed air, a supply of compressed air may be provided at the transfer position of the device 1, which supply of compressed air supplies compressed air p through a compressed air nozzle 15 and into the pressure chamber 14 via the air inlet 14a which is shaped in a suitable manner for the purpose of a temporary airtight connection, when the document carrier device 4a or 4b has reached the transport position 6 and, in the course of this, has come to rest, with its air inlet 14a, on the compressed air nozzle 15.

In addition, a non-return valve 14b is provided in the air inlet 14a, which non-return valve 14b is arranged to close the pressure chamber 14 in an airtight manner after it has been filled with compressed air p through the compressed air nozzle 15. In this way, the pressure chamber 14 can maintain the pressure exerted by it, at least indirectly (for example via corresponding pneumatic elements), on the pressing element 10, and thus fix the document D, even when the document carrier device 4a, b has left the transfer position 6 in order to traverse its path curve and is thus cut off from the supply of compressed air at the compressed air nozzle 15.

Further, the housing 8 has housing recesses 11a, b for the introduction of a respective centering element 13a, b for aligning, in particular centering, the document D in the document tray 9 prior to fixing by the pressing element 10. The centering elements 13a and/or 13b can be constructed in the form of one or more centering pins which can engage with the housing 8 of the document carrier device 4a and/or 4b through the housing recess 11a and/or 11b, when the document carrier device 4a and/or 4b is located at the transfer position 6, in order to perform the centering, mentioned above, by mechanical interaction with the document D. For this purpose, the centering pins 13a and 13b, each driven by a linear actuator 12a and 12b, respectively, such as a linear motor or a pressure cylinder, can be inserted temporarily into the housing 8. The inclined position of the actuators advantageously enables the introduction of the centering pins as well as the centering itself to be accomplished by a single linear movement per centering element.

Finally, the housing also has at least one housing recess on its upper side for personalizing the document when the latter is located in the operating region 2a. Thus, applying printing to the document D can be carried out through this housing recess 11c. Other process steps can also be carried out in the same way with respect to the document D through this housing recess 11c, for example drying of previously printed ink or contacting of the document D with write heads or read heads for writing or reading data to or from a data memory of the document D.

Figure 3B:
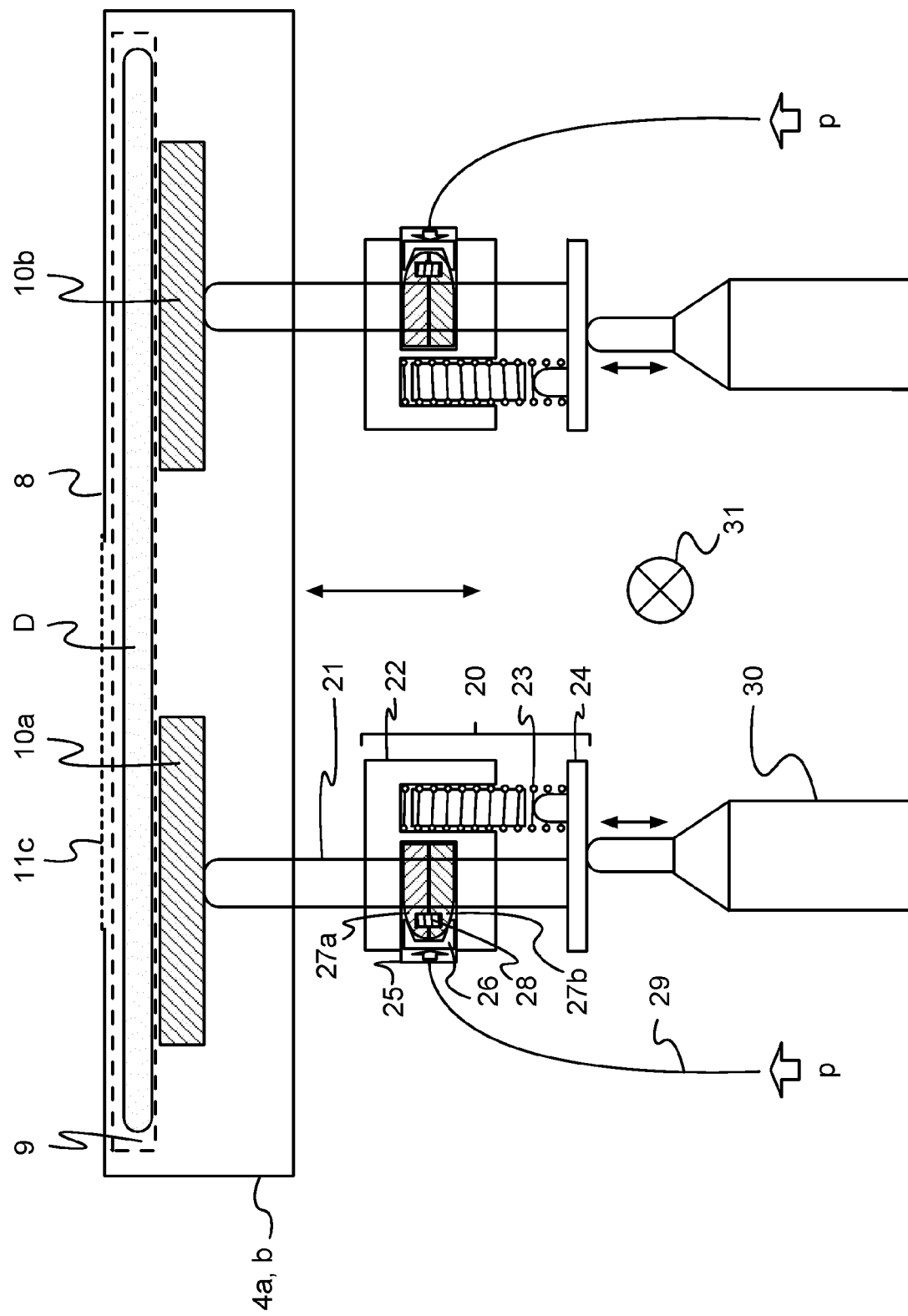
FIG. 3B is a schematic representation of a document carrier device of the device of FIG. 1, as well as a fixing device of the device in accordance with a second example embodiment.

FIG. 3B schematically illustrates a document carrier device 4a and/or 4b of the device of FIG. 1, as well as an example of a fixing device for this, in accordance with a second example embodiment thereof, in a sectional view, in which the viewing direction runs along the transport direction 31, along which the documents D are transported by the transport device 5 to, and/or from, the transfer position 6. In this embodiment, a plurality of clamping mechanisms are provided as part of the document carrier device 4a and/or 4b, but their manner of operation is different from that of the fixing device of FIG. 3A. Other than that, the document carrier device substantially corresponds to the document carrier device of FIG. 3A, including the respective centering functionality.

Instead of a single pressing element, two (or alternatively more than two) pressing elements 10a and 10b are provided in this second embodiment in order to fix the document D in the document carrier device 4a and 4b, respectively, again by pressing it firmly against the opposite inner wall of the housing 8 of the document carrier device 4a and 4b, respectively. Each of the pressing elements 10a and 10b is associated with its own clamping mechanism, the operation of which will now be explained by way of example with reference to the clamping mechanism for the pressing element 10a.

The pressing element 10a is coupled, via a piston rod 21, to a fixing device 20, which is provided for pressing the pressing element 10a against the document D for the purpose of fixing the document D and for fixing the document D in this position relative to the document carrier device, as well as for temporarily releasing this fixing action for the purpose of subsequently releasing the document after it has been personalized at the transfer position 6, in order to allow the personalized document to be exchanged for a new document which is still to be personalized.

The fixing device 20 comprises a clamping unit 22 with a guide channel for the piston rod 21, in which the latter can be clamped by a clamping cartridge 25. A shaped piece 26 is arranged in the clamping cartridge 25 so as to be displaceable in a direction which is perpendicular to the piston rod 21. In addition, two clamping jaws 27a and 27b which are constructed so as to be mirror images of each other are provided in the clamping cartridge 25. In a first state, in which the clamping jaws 27a and 27b are not forced into a certain position by the shaped piece 26, they are spread in a direction away from each other by an expansion spring 28 which is located in corresponding opposing recesses of the two clamping jaws 27a and 27b, and thereby tilted against each other, as well as against the piston rod 21. In this way, in this first state, the piston rod 21 is clamped by the two clamping jaws and is thus locked.

In a different, second state, on the other hand, compressed air p is supplied to the clamping cartridge 25 via a compressed air supply line 29, which may be constructed in the form of a compressed air hose or compressed air pipe, which compressed air p acts on the shaped piece 26 in the clamping cartridge 25 and causes the shaped piece 26 to move under pressure in a direction substantially perpendicular to the piston rod 21 in the direction of the clamping jaws 27a and 27b. On their side facing towards the shaped piece 26, the two clamping jaws 27a and 27b are shaped in such a way that, when they come into contact with the shaped piece 26 and are subjected to pressure by the latter, they are pressed towards each other so that they compress the expansion spring 28 and eventually assume a substantially parallel position with respect to each other, as a result of which the tilting with respect to the piston rod 21 is removed and the latter is released. As a result of this, a compression spring 23, which is also provided in the clamping unit 22 and which extends substantially parallel to the piston rod 21, can act and, in the process, a force which is directed away from the document carrier device (i.e. downward in FIG. 3B) can be applied to a base plate 24 of the clamping unit 22. Since the piston rod 21 is also attached to this base plate 24 with its end which is opposite the pressing element 10a, this force also acts on the piston rod 21 and on the pressing element 10a, which, in turn, is attached thereto, which is thus pulled away from the document D (downwards in FIG. 3B) and thus releases the latter.

If, after the document has been exchanged, the newly received document D is now to be fixed again, the base plate 24 is first moved in the direction of the document D by a piston 30, which may be constructed in the form of a pneumatically driven or motor driven piston, so that the pressing element 10a finally subjects the document D to the pressure intended for fixing the document D. Thereafter, the compressed air in the clamping cartridge 25 is released, as a result of which the shaped piece 26 is moved back to its original position by a return spring (not shown), the two clamping jaws 27a and 27b are spread with respect to each other due to the expansion spring 28, which is now effective again, and are tilted with respect to the piston rod 21, and thus the latter is fixedly clamped. Thus, the first state of the fixing device 20 is reached again.

Now, if the path curve of the document carrier device 4a and/or 4b starts again, the document D remains fixed in this way in the first state during its traversal of the path curve until, when the transfer position 6 is reached again, the fixing device 20 is again transferred to the second state in order to allow the subsequent exchange of document to take place.

This second embodiment also has the advantage that the document carrier device 4a and/or 4b does not have to be connected to connections for the purpose of fixing the document D, for example to pneumatic hoses or electrical connections, during the traversal of the path curve. In addition, this embodiment also enables particularly fast traversal times and/or high cycle rates, since, in contrast to the embodiment in accordance with FIG. 3A, a time-consuming filling of a pressure chamber is not necessary.

The centering and/or aligning of the respective newly received document D in the transfer position 6 is carried out in the same manner as has already been described above in connection with FIG. 3A.

Figure 4:
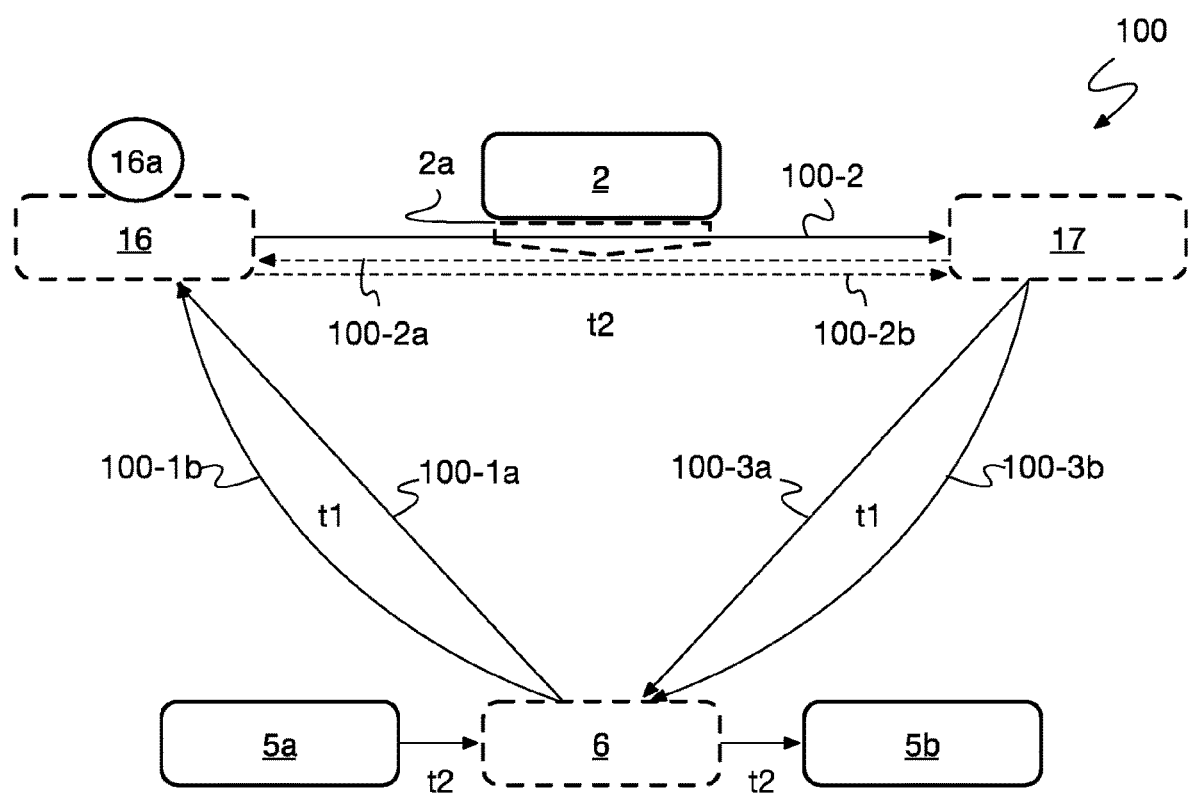
FIG. 4 is a schematic view of different variants for the course of the path curves of the document carrier devices of the device of FIG. 1, in accordance with a first example embodiment.
Figure 5:
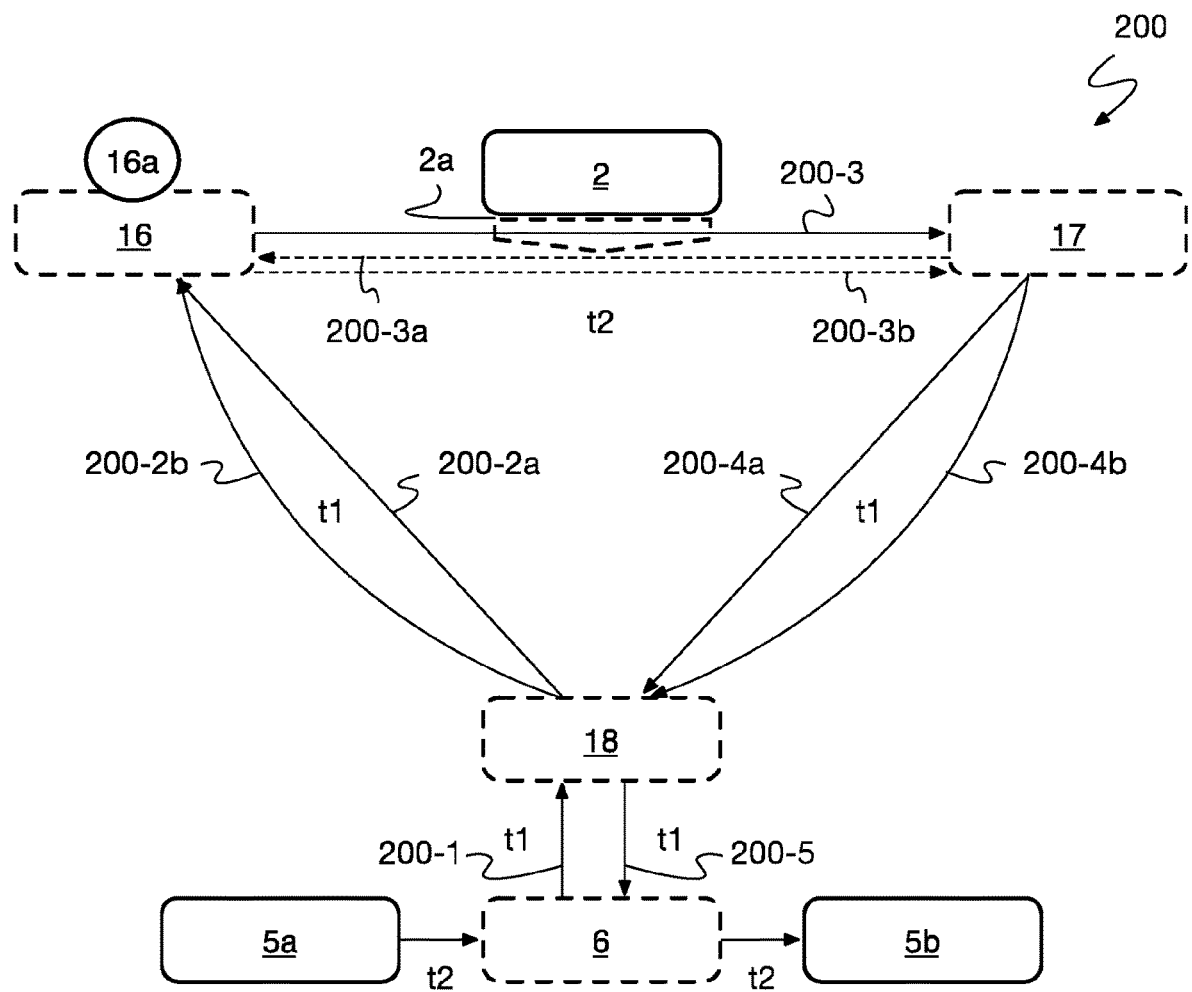
FIG. 5 is a schematic view of different variants for the course of the path curves of the document carrier devices of the device of FIG. 1, in accordance with a second example embodiment.
Figure 6:
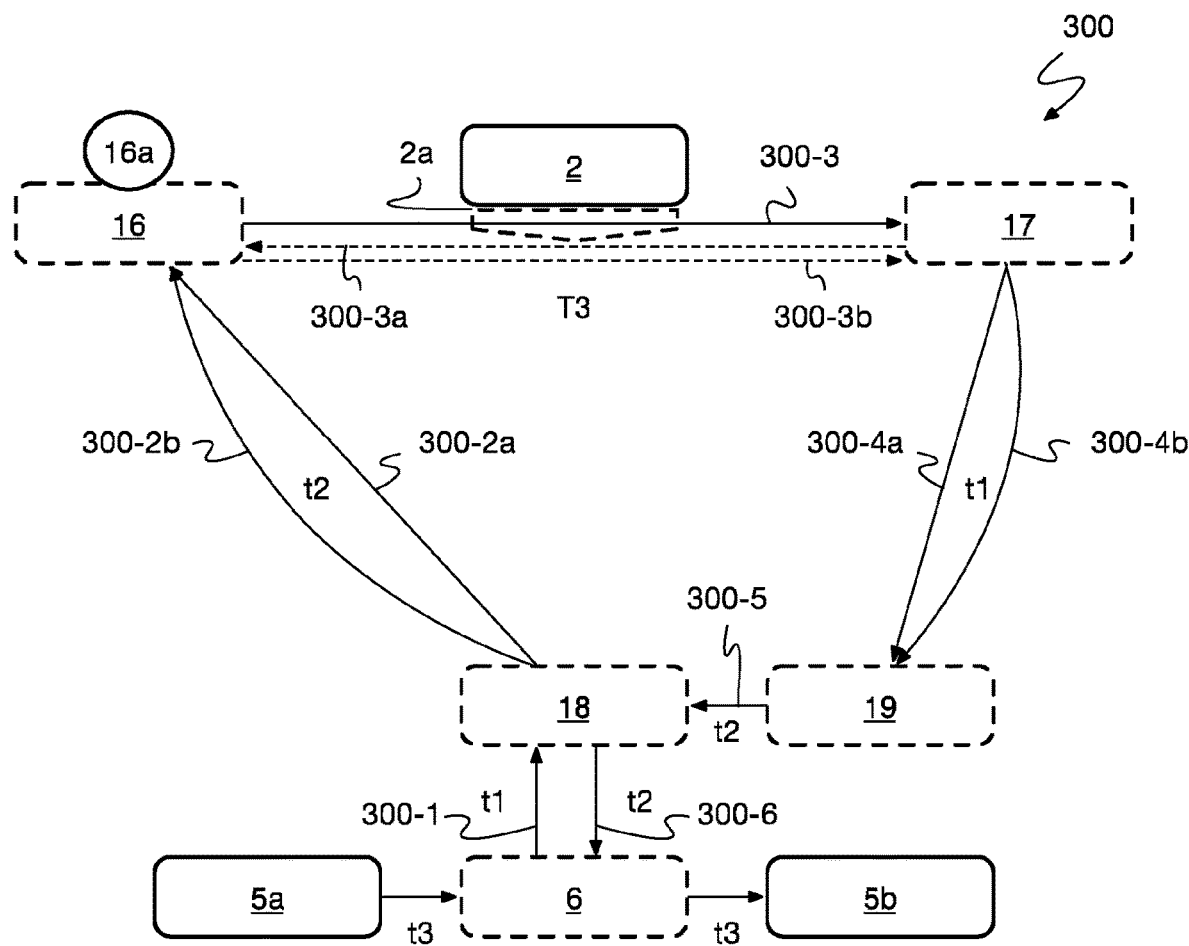
FIG. 6 is a schematic view of different variants for the course of the path curves of the document carrier devices of the device of FIG. 1, in accordance with a third example embodiment.

FIGS. 4 to 6 represent a combined description of embodiments of the device in accordance with the invention, as well as the method in accordance with the invention corresponding to this.

The variants for the course of the path curves of the document carrier devices of the device of FIG. 1, schematically shown in FIG. 4, result from three consecutive path portions 100-1 to 100-3 in a first example embodiment of the invention, which, due to its particularly short path curve length, is optimized with regard to maximizing the throughput that can be achieved.

In particular, in this context, the path curves of the document carrier devices 4a and 4b may coincide or may however be at least substantially parallel to each other. In this context, however, in both cases the same transfer position 6 is reached within the framework of the path curve, which represents the place where documents, which are fed from the first transport path portion 5a of the transport device 5, are loaded into the corresponding document carrier device 4a and/or 4b and, after their respective personalization, are unloaded onto the second transport path portion 5b of the transport device 5.

Starting from the transfer position 6 at the level of the transport device 5, each of the document carrier devices 4a and 4b passes, during the course of its, preferably periodic, traversal of its path curve, through a first path portion 100-1, which leads from the transfer position 6 to a starting position 16 of a subsequent path portion 100-2, in which the document personalization takes place. This first path portion 100-1 can optionally run in a straight line (variant 100-1a) or in the shape of an arc (variant 100-1b), in particular in accordance with a corresponding control by the control device 7. However, other shapes of path curves are also conceivable, in particular also path curves which run in the shape of an arc above the variants 100-1a running in a straight line and which, for example, result from this variant 100-1b by generating a mirror image of variant 100-1b, using the straight line of variant 100-1a as an axis of symmetry. At the same traversal speed, due to the greater path length, the duration of the traversal for the variant 100-1b in the shape of an arc is longer by a corresponding amount. Accordingly, by a specific selection, by the control device 7, of the path portion variant 100-1*a* or 100-1*b* to be used, the phase of the traversal of the document carrier device 4*a* and/or 4*b* along its path curve can be readjusted or corrected during operation. In particular, this can be used to compensate for unforeseen delays in the sequence of movements of one or more of the document carrier devices 4*a*, *b*, which unforeseen delays have been detected by the sensor device 7*a* in the form of corresponding movement parameters, such as position, speed or acceleration. In addition, an inspection device 16*a*, in particular a camera, may be provided at the starting position 16, which serves to detect the relative position of the document in the respective document carrier device and to transmit this information directly, or indirectly, for example via the control device 7, to the personalization device 2. The latter can then, on the basis of this information, appropriately take into account, in particular adapt, the carrying out of the personalization, in particular with respect to an orientation thereof relative to the document.

The second path portion 100-2 then follows, in which the document carrier device 4*a*, *b* is moved from the starting position 16 through the operating region 2*a* of the personalization device 2, in which the personalization of the document takes place, to an end position 17 of this path portion. In further variants for the course of the path curve of the document carrier devices, the path curve passes through the operating region 2*a* of the personalization device 2 multiple times. In particular, this can be done in such a way that the second path portion is extended by the portions 100-2*a* and 100-2*b* which again lie between the starting position 16 and the end position 17. The portions 100-2*a* and 100-2*b* can also be added multiple times as extensions. Thus, what happens in these variants is that, overall, the operating region is traversed multiple times, whereby different personalization actions of the document transported by the respective document carrier device can take place, such as for example one or more printing actions, laser treatment processes, magnetization processes, perforations, etc.

From the end position, after the traversal of the second path portion, the third path portion 100-3 follows, for returning the document carrier device 4*a* and/or 4*b* to the transfer position 6. At least two different path curve variants can be provided for this third path portion 100-3 as well, in particular again a variant 100-3*a* in a straight line, as well as a variant 100-3*b* in the shape of an arc, or also again a variant in the shape of an arc above the respective variant in a straight line. What has been stated above with regard to the first path portion in terms of the possibility of selecting from these variants equally applies to the third path portion 100-3.

The movement of the document carrier devices 4*a* and/or 4*b* along the path curve illustrated in FIG. 4 may take place in a clocked manner in accordance with a system clock. For example, as illustrated, this can take place in such a manner that a first document carrier device, for example the document carrier device 4*a*, traverses the first path portion 100-1 in a first clock cycle t1 in order to reach the position 16, while at the same time the other document carrier device 4*b*, coming from the position 17, is on its way back to the transfer position 6 on the path portion 100-3. In a second clock cycle t2 which immediately follows onto the first clock cycle t1, the first document carrier device 4*a* then traverses the second path portion 100-2, in which the personalization of the document received in this document carrier device takes place, while at the same time at the second document carrier device 4*b*, which at this point in time has reached the transfer position 6 and is resting there, the document which has so far been accommodated in this document carrier device 4*b* is discharged to the second transport path portion 5*b* of the transport device 5, and at the same time or immediately thereafter a new document is received into this document carrier device 4*b* from the first transport path portion 5*a* of the transport device 5 for a new run.

In FIG. 5, an embodiment 200, which is alternative to FIG. 4, is illustrated with a modified course of the path curve of the document carrier devices 4*a* and/or 4*b* of the device 1. This embodiment differs from that of FIG. 4 primarily in that, above the transfer position 6, a first intermediate position 18 is provided along the path curve, wherein a movement of the document carrier devices 4*a* and 4*b* takes place in a straight line in both directions between the transfer position 6 and this first intermediate position 18. During the course of the traversal of the path curve, starting from the transfer position 6, each of the document carrier devices 4*a* and 4*b* thus first traverses a straight path portion 200-1 up to the first intermediate position 18, before, starting from there, a movement which is similar to the path curve described in FIG. 4 along a second path portion 200-2*a* or 200-2*b*, a third path portion 200-3 and a fourth path portion 200-4*a* or 200-4*b* back to the first intermediate position 18 takes place. Finally, there also follows the fifth portion 200-5 in a straight line, which leads back to the transfer position 6.

Here, too, a clocked operation is conceivable, which can proceed in such a way that the respective document carrier device 4*a* and/or 4*b* traverses the first and second path portions 200-1 and 200-2 up to the position 16 in a first clock cycle t1, while at the same time the respective other document carrier device 4*b* or 4*a*, coming from the position 17, traverses the fourth path portion 200-4 and the fifth path portion 200-5 back to the transfer position 6. In the subsequent second clock cycle t2, on the one hand, again, a continuation of the movement of the document carrier device 4*a* or 4*b*, which is at the position 16 at the beginning of the clock cycle, takes place along the third path portion 200-3, as well as, on the other hand, the unloading and loading of the other document carrier device 4*b* or 4*a*, which remains at the transfer position 6 during this clock cycle. The path portions 200-2 and 200-4 can again, similar to what is shown in FIG. 4, comprise a variant 200-2*a* and 200-4*a*, respectively, in a straight line, and a variant 200-2*b* and 200-4*b*, respectively, in the shape of an arc, or however again a variant in the shape of an arc above the respective variant in a straight line. Also, other courses of variants of different lengths are again conceivable.

When compared with the embodiment in accordance with FIG. 4, the embodiment in accordance with FIG. 5 has the advantage that, due to the introduction of the first intermediate position 18, the document carrier devices are conveyed perpendicularly, or at least substantially perpendicularly, into or out of the transfer position 6, so that tangential movement components, which, in particular in view of the rapid movements which are associated with the desired short durations of the traversal, could potentially lead to damage to the transport device 5 or the compressed air nozzle 15 or the compressed air inlet 14*a* of FIG. 3, are avoided. Also, to this end, the speed of movement in the path portions 200-1 and 200-5 may be reduced when compared with the path speed on one or more of the other path portions.

In FIG. 6, a further embodiment 300, which is alternative to that of FIGS. 4 and 5, is illustrated with a further modified course of the path curve of the document carrier devices 4*a* and 4*b* of the device 1. This embodiment differs from that of FIG. 5 mainly in that, in addition, in the return path from the position 17 to the transfer position 6, a second intermediate position 19 is provided upstream of the first intermediate position 18, which second intermediate position 19 may be at the same level as the first intermediate position 18. The movement curve is thus subdivided here into six path portions, whereby the first path portion 300-1 leads from the transfer position 6 to the first intermediate position 18, the second path portion 300-2 leads from there to the position 16, the third path portion 300-3 leads from there to the position 17, the fourth path portion 300-4 leads from there to the second intermediate position 19, the fifth path portion 300-5 leads from there back to the first intermediate position 18, and finally the sixth path portion 300-6 leads from there back to the transfer position 6 in order to close the path curve. The path portions 300-2 and 300-4 can again, similar to what is shown in FIG. 4, comprise a variant 300-2a and 300-4a, respectively, in a straight line, and a variant 300-2b and 300-4b, respectively, in the shape of an arc, or however again a variant in the shape of an arc above the respective variant in a straight line. Also, other courses of variants of different lengths are again conceivable.

Here, too, a clocked operation is again possible, in particular in such a way that (i) in the first clock cycle t1, a first one of the document carrier devices 4a or 4b traverses the first path portion 300-1, while, at the same time, the second document carrier device 4b or 4a, respectively, traverses the fourth path portion, (ii) in the subsequent second clock cycle t2, the first document carrier device 4a or 4b traverses the second path portion 300-2, while, at the same time, the second document carrier device 4b or 4a traverses the fifth path portion 300-5 and then the sixth path portion 300-6, and (iii) in the subsequent third clock cycle t3, the first document carrier device 4a or 4b traverses the third path portion 300-3, while, at the same time, the second document carrier device 4b or 4a remains at the transfer position 6 and is loaded and unloaded there.

Through the introduction of this second intermediate position 19, the operational safety of the device 1 can be further increased, in particular with regard to the avoidance of collisions of the document carrier devices 4a and 4b. This results from the fact that, in accordance with the clock-based timing described above, in contrast to the clock-based timing which has been described in connection with the embodiment of FIG. 5, the path curve region corresponding to the path portions 300-1 and 300-6 is always traversed by the two document carrier devices 4a, 4b with a timing offset. An advantage of this second intermediate position also arises, in particular, if it is intended that more than two document carrier devices are in the device or if delays occur in the process sequence during the course of the movement sequence of a document carrier device which is currently located at the transfer position. In both cases, the next subsequent document carrier device can wait at the second intermediate position until the transfer position has become free again, so that collisions of document carrier devices can be effectively prevented in such cases as well.

Each of the document carrier devices 4a and/or 4b may also be constructed so as to be rotatable through 180 degrees in order to enable, in addition to the processing of the front face of the document described above, also a processing, in particular of the same type, of the reverse of the document to be personalized to be carried out by the device 1.

In addition, as has already been explained above with particular reference to FIG. 4, it is possible for the device 1 to be configured in such a way that the path curves of the document carrier devices 4a and/or 4b comprise a plurality of reversals of movement in the region between the positions 16 and 17 in order to move the respective document carrier device 4a and/or 4b back and forth between a plurality of processing stations of the personalization device or, if applicable, between a plurality of separate personalization devices, in order to provide the respective document in the corresponding document carrier device 4a or 4b, respectively, with a personalization to be produced in a plurality of stages, or with a plurality of personalization, in particular with a plurality of different personalization.

In these variants of embodiments with multiple traversals of the operating region 2a during a traversal of a path curve, it is also possible for the device to be configured in such a way that, while a first document carrier device 4a is located in the operating region 2a of the personalization device 2, the movement of a second document carrier device 4b is slowed down. In particular, it is possible for this to be envisaged in such a way that the path speed of the second document carrier device 4b is then reduced and/or in such a way that, as has already been described, the path curve is made longer by selecting correspondingly longer path portions (for example the path portions 100-1b, 200-2b, 300-2b and/or 100-3b, 200-4b, 300-4b) instead of shorter ones (for example the path portions 100-1a, 200-2a, 300-2a and/or 100-3a, 200-4a, 300-4a, respectively) in order to delay the time of arrival of the second document carrier device 4b at the starting position 16, and thus to give the first document carrier device 4a sufficient time for the multiple traversal of the operating region 2a (and vice versa). It is also possible to adjust (slow down) the process of loading (picking up a document) and unloading (discharging a document) of the document carrier devices 4a, b at the transfer position 6 accordingly.

Figure 7:
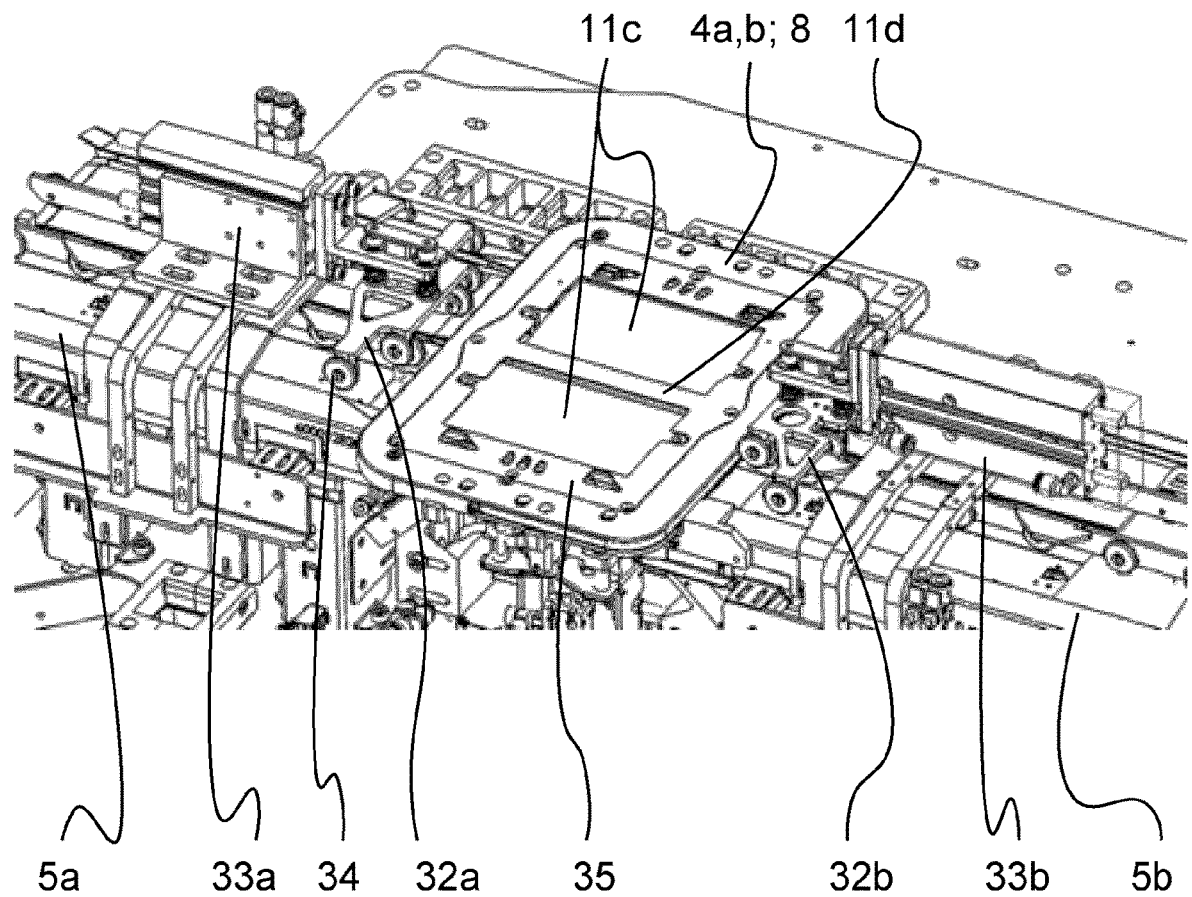
FIG. 7 is a detailed view of the transfer position and its immediate surroundings in a preferred embodiment of a device having a hold-down device for assisting in the loading and unloading of the document carrier devices, whereby the hold-down device is shown in a deactivated condition.
Figure 8:
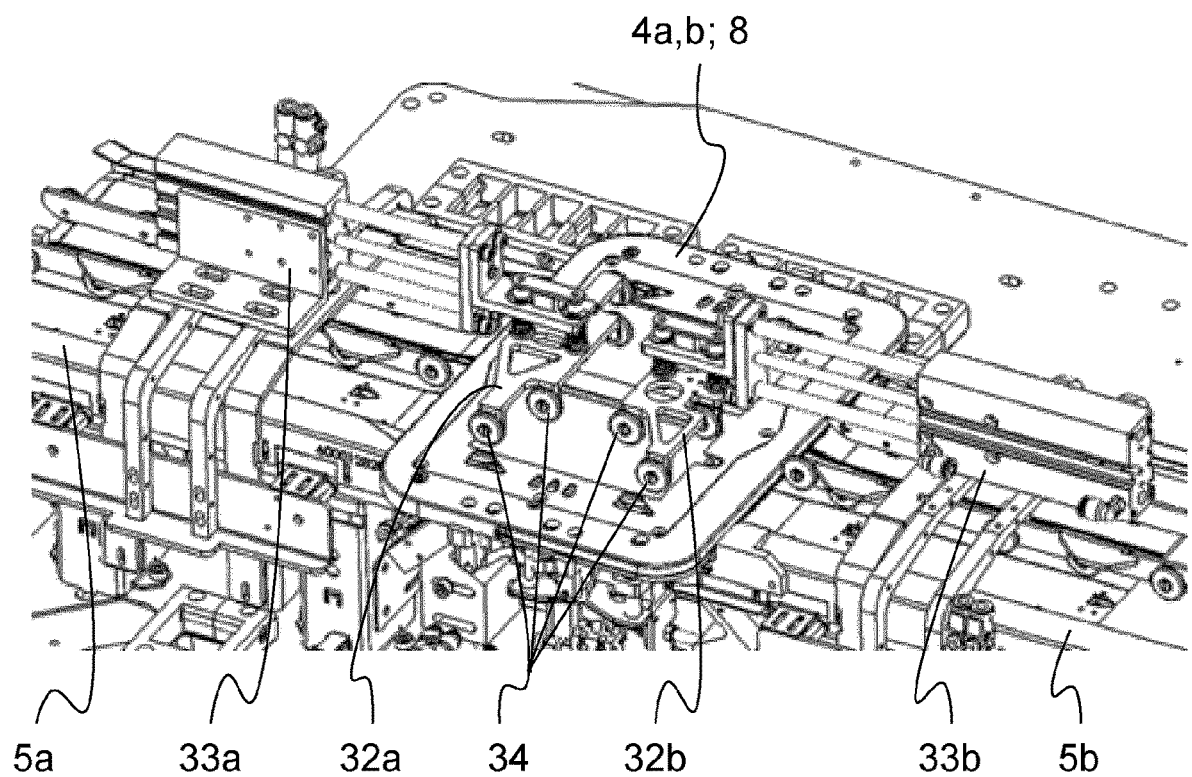
FIG. 8 is a detailed view of the transfer position and its immediate surroundings of the embodiment of FIG. 7, whereby the hold-down device is shown in an activated condition.

FIGS. 7 and 8 each show a detailed view of the transfer position 6 and its immediate surroundings in a preferred embodiment of a device 1 in accordance with the invention having a hold-down device for assisting the loading and unloading of the document carrier devices, wherein the hold-down device is shown in a deactivated condition in FIG. 7 and in an activated condition in FIG. 8.

In addition, the (visible) upper side of the housing 8 of the example document carrier device 4a (or 4b) shown at the transfer position 6 has two large housing recesses 11c, which are separated from one another by an intermediate web 11d extending between them, and which are configured in such a way that an application of a personalization of the document D in the document carrier device 4a can be carried out through them in the operating region 2a. In particular, the two housing recesses 11c can be configured, in particular dimensioned and arranged, in such a way that a document D in the shape of a booklet, such as for example a passport, which has been received in the document carrier device 4a comes to rest in the document carrier device 4a in such a way, that two adjacent pages of the opened document D in the shape of a booklet can be personalized simultaneously or immediately one after the other, wherein each one of the opened pages is largely exposed by an associated one of the two housing recesses 11c, but at the same time is surrounded in a frame-like manner by the upper side of the housing 8 in cooperation with the intermediate web 11d and is thus fixed. In this way, a particularly efficient personalization of the fixed document D in the shape of a booklet is made possible through the respective housing recesses 11c. In particular, a passport personalization of the two adjacent opened passport pages over (almost) the entire area is made possible in this way. For example, it is thus possible for the entire personal data or holder data including passport photo to be printed and/or to be applied by laser treatment on the data page (holder page) and/or for printing to be applied to the other passport page next to it (for example a paper page or page 3 in the case of a German passport), likewise with an additional passport photo and/or additional user data.

The hold-down device is arranged in such a way that, during the operation of the device, when one of the document carrier devices 4a, b is located at the transfer position 6, it temporarily exerts a guiding force on the document D through its housing recesses 11c in order to hold the document D down, at least in places, while it is being received into the cavity 9 of the housing 8 or is discharged therefrom. The hold-down device comprises at least one component assembly, preferably—as shown in FIGS. 7 and 8—a respective component assembly on both sides of the transfer position 6. In this context, each component assembly comprises a respective hold-down unit 32a and 32b provided with guide rollers 34 for physical contact with the document D, as well as a hold-down drive for activating or deactivating the associated hold-down unit 32a and 32b, respectively. The guide rollers 34 may be made of silicone or plastics material. During the document transfer when picking up and discharging the document D, the guide rollers 34 ensure low friction so that, despite the large housing recesses 11c, a sufficiently high short process time for the document transfer can be achieved, as well as protection of the document D during the transfer.

As is shown in FIG. 8, in the activated condition the hold-down units 32a, b are moved out of the condition shown in FIG. 7 over the housing recesses 11c, so that the guide rollers engagingly reach through the housing recesses 11c and contact the document D with the guide rollers and hold it down under the application of pressure during the processes of picking up and discharging the document D into, or out of, the document carrier device 4a, which can be carried out in cooperation with one or more of the pressing elements 10 mentioned above. In this way, in particular, action is taken against the risk that, during the picking up or the discharging actions, the document could get caught on, or hit against, an edge of the housing recesses 11c or transport guides in the region of the removal of documents.

The device is further configured such that, when the picking up process and/or the discharging process has been completed, it returns the hold-down device to the deactivated condition as shown in FIG. 7, so that the document carrier device 4a can again start the next traversal of the path curve without being hindered by the hold-down device. Hold-down devices are respectively driven towards each other and away from each other via lift cylinders. Alternatively, only one hold-down unit could be provided either over the first transport path portion 5a for supplying documents or over the second transport path portion 5b for removing documents.

The operation of the hold-down device may proceed in accordance with the following process scheme:

1. When a document carrier device 4a arrives at the transfer position 6 after traversing the path curve, the hold-down device is activated, as a result of which the hold-down units 32a, b simultaneously move toward each other from their respective sides and, in doing so, move over the housing recesses 11c of the document carrier device 4a.

2. The document which has already been personalized and which is located in the document carrier device 4a is discharged from the document carrier device 4a and the next document D which has not yet been personalized is received in the document carrier device 4a which now has just become free.

3. The document D, which has not yet been personalized, is centered and clamped in the document carrier device 4a (as has been described above).

4. The hold-down device is deactivated, so that the hold-down units 32 a, b are again moved back to their initial position as shown in FIG. 7, thereby releasing the transfer position 6, as a result of which the newly loaded document carrier device 4a can leave the transfer position 6 for a new traversal of the path without being hindered.

Apart from that, the device of FIGS. 7 and 8 may correspond to the device 1 of FIG. 1.

In addition, the document carrier device 4a may be constructed so as to be configurable in such a way that the upper side of the housing comprises an exchangeable plate (mask) 35 with the at least one housing recess 11c, so that, depending on the type of document and/or the personalization envisaged, by converting the document carrier device 4a by an exchange of the mask, a corresponding adaptation of the device can be carried out in a simple manner. The personalization device 2 can optionally also be arranged so as to be movable transversely to the movement of the document carrier devices 4a, b, in order to personalize the document D or, respectively, the adjacent pages of the document while these are located in the operating region 2a and/or while the respective document carrier device 4a, b passes through the operating region 2a.

While at least one example embodiment has been described above, it is to be noted that a large number of variations thereto exist. In this context it is also to be noted that the example embodiments described herein only illustrate non-limiting examples, and that it is not intended thereby to limit the scope, the applicability, or the configuration of the devices and methods described herein. Rather, the preceding description will provide the person skilled in the art with instructions for the implementation of at least one example embodiment, whereby it is to be understood that various changes in the functionality and the arrangement of the elements described in an example embodiment can be made without thereby deviating from the subject matter respectively set forth in the appended claims as well as legal equivalents to this.

What is claimed is:

1. A device for personalizing documents, wherein the device comprises:
   a personalization device for applying personalization information to a document to be personalized, the document being located in an operating region of the personalization device, the personalization information being associated with the document to be personalized;
   a conveying device which comprises at least two movable document carrier devices, each of which is configured:
      to receive the document to be personalized at a transfer position of the device that is the same for each of the at least two movable document carrier devices;
      to move the document received, into the operating region of the personalization device for the purpose of being personalized; and
      to move the document received, after personalization, back to the transfer position and to discharge it there;
   wherein the conveying device, during operation, conveys each of the at least two movable document carrier devices along a respective associated path curve in the shape of a closed loop, wherein a conveying movement of each of the at least two movable document carrier devices along the respective associated path curve is carried out in a temporally staggered manner with respect to the respective conveying movement of others of the at least two movable document carrier devices in the same direction in such a way that the at least two movable document carrier devices do not collide with each other during their respective conveying movements along the respective associated path curve, wherein the device for personalizing documents further comprises:

a control device for controlling the device; and a sensor device which is configured to detect, at one or more particular points along the respective associated path curves, one or more current movement parameters of the at least two movable document carrier devices and to communicate the one or more current movement parameters to the control device;

wherein the control device is configured to control the device as a function of the one or more current movement parameters, wherein the conveying device is arranged to vary the respective associated path curve of at least one of the at least two movable document carrier devices as a function of a corresponding control, by the control device, on a basis of the one or more current movement parameters, and wherein each respective associated path curve is defined by a movement path of finite length of one of the at least two movable document carrier devices, such that varying of the respective associated path curve changes a movement length or a movement curvature along the movement path of the at least one of the at least two movable document carrier devices.

2. The device in accordance with claim 1, further comprising:

a transport device which is arranged to feed the document to be personalized to the transfer position along a transport path, for receiving the same by one of the document carrier devices, and to convey, away from the transfer position, the document which has already been personalized by the personalization device and which has been discharged at the transfer position by one of the document carrier devices.

3. The device in accordance with claim 2, wherein the conveying device comprises respective conveying units on both sides of the transport path for conveying at least one of the document carrier devices along their respective path curve.

4. The device in accordance with claim 1, wherein the device is further configured to carry out the respective conveying movements of the document carrier devices along their respective path curves in such a way that an intermediate stop takes place at least at the transfer position.

5. The device in accordance with claim 1, wherein a time offset of the movements of the document carrier devices along their respective path curve is determined in such a way that, at a point in time at which one of the document carrier devices is located at the transfer position, another of the document carrier devices is at the same time located in the operating region of the personalization device.

6. The device in accordance with claim 1, wherein the device is further configured:

when one of the document carrier devices is located at the transfer position, to discharge the document which is currently carried by the one of the document carrier devices and which has already previously been personalized by the personalization device, and, in its place, to pick up, into the one of the document carrier devices a further document yet to be personalized by the personalization device before the one of the document carrier devices continues movement for a new traversal of its path curve.

7. The device in accordance with claim 1, wherein the path curve of at least one of the document carrier devices is determined in such a way that, during operation of the device, the path curve has a curve portion between the transfer position and a first intermediate position, the curve portion being traversed twice per traversal of the path curve, wherein the curve portion is traversed, on one hand, in a course of an away movement of the document carrier device from the transfer position to the first intermediate position and, on another hand, offset in time with respect thereto and in an opposite direction in a course of a toward movement of the document carrier device from the first intermediate position to the transfer position, during the traversal, in the same direction, of the path curve in the shape of a loop by the document carrier device.

8. The device in accordance with claim 7, wherein:

the path curve of the at least one document carrier device further comprises a second intermediate position which is located between the operating region and the first intermediate position; and the device is further configured to carry out a movement of a first one of the document carrier devices, which movement takes place in a course of the away movement from the transfer position along the curve portion, with a time offset before a movement of a directly following second one of the document carrier devices in the course of the toward movement from the second intermediate position via the first intermediate position to the transfer position, in such a way that the second document carrier device cannot reach the first intermediate position until the first document carrier device has already left the first intermediate position again.

9. The device in accordance with claim 1, wherein the device is further configured to carry out the conveying movements of the document carrier devices in a clocked manner in accordance with a common system clock, wherein each path curve is subdivided into at least three path portions and one or two successive path portions are traversed per individual clock cycle of the system clock.

10. The device in accordance with claim 1, wherein the device is further configured to carry out the conveying movements of the document carrier devices along their respective path curve in a periodical manner, so that the conveying movements of the document carrier devices, which conveying movements are offset in time, are out of phase with each other.

11. The device in accordance with claim 1, wherein the device is further configured in such a way that the path curves of at least two of the document carrier devices coincide in the operating region, so that the personalization of documents carried by these document carrier devices takes place at the same location or in the same local area within the operating region of the personalization device.

12. The device in accordance with claim 11, wherein the device is further configured in such a way that the path curves of at least two of the document carrier devices coincide in their entirety.

13. The device in accordance with claim 1, wherein the path curve of at least one of the document carrier devices is defined in such a way that, in a course of the operation of the device, the path curve has a curve portion which is traversed several times per traversal of the path curve and which runs through the operating region, wherein a respective personalization of the document picked up by the at least one of the document carrier devices is carried out by the personalization device during at least two of these traversals of the curve portion during one and the same traversal of the path curve while the at least one of the document carrier devices is located in the operating region.

14. The device in accordance with claim 1, further comprising:
an inspection device which is located along the respective path curves of the document carrier devices and upstream of the respective operating region of the personalization device, the inspection device being provided for detecting the position of the document picked up by one of the document carrier devices with respect to the one of the document carrier devices and for determining and transmitting at least one position parameter which characterizes the position;
wherein the personalization device is configured to carry out a self-calibration on the basis of the at least one position parameter in order to compensate for any deviations in alignment between the document and the personalization device as determined on the basis of the at least one position parameter, in order subsequently to apply, on the basis of the self-calibration, a personalization to the document irrespective of its relative position with respect to the one of the document carrier devices carrying it.

15. The device in accordance with claim 14, wherein the personalization device is further configured:
to personalize the document by applying printing to it; and
to carry out, within the self-calibration, an adjustment of a target print layout for a personalization to be applied to the document by printing thereon, by a transformation which is dependent on the at least one position parameter, into an actual position-compensated print layout to be printed.

16. The device in accordance with claim 14, wherein the personalization device is further configured:
to personalize the document by laser treatment; and
to carry out, within the self-calibration, an adjustment of a target laser treatment layout for a personalization to be applied to the document by the laser treatment, by a transformation which is dependent on the at least one position parameter, into an actual position-compensated laser treatment layout to be generated.

17. The device in accordance with claim 1, wherein at least one of the document carrier devices comprises a fixing device for fixing a document carried by the document carrier device during the traversal of its path curve.

18. The device in accordance with claim 17, wherein:
the document carrier device has a cavity for at least partially receiving the document; and
the fixing device is constructed as a clamping device which is configured in such a way that, in operation, for fixing the document in the cavity, it temporarily applies a pressure to the document at least from one side in order to press the document against an opposite inner wall of the cavity and thereby to fix it.

19. The device in accordance with claim 18, wherein the clamping device is configured to provide the pressure for temporarily applying pressure to the document for fixing it in place by pneumatic force.

20. The device in accordance with claim 19, wherein the clamping device comprises a pneumatic pressure chamber which is configured to be filled at the transfer position under pressure and, while the associated document carrier device traverses the path curve outside the transfer position, to apply pneumatic pressure to the document for fixing it by the clamping device, without external supply of pneumatic pressure.

21. The device in accordance with claim 18, wherein the clamping device is coupled to a fixing device provided as part of the document carrier device, which fixing device is configured to releasably lock the position of the clamping device when the clamping device is pressed onto the document under pressure in order to fix the document.

22. The device in accordance with claim 1, wherein at least one of the document carrier devices comprises an alignment device for aligning the document which has been picked up by the at least one of the document carrier devices in accordance with a predetermined target alignment.

23. The device in accordance with claim 1, wherein at least one of the document carrier devices comprises a housing in which there is a cavity to at least partially receive the document, wherein the housing has at least one housing recess which is configured in such a way that a personalization of the document by the personalization device is possible through the at least one housing recess when the document is located in the operating region.

24. The device in accordance with claim 23, wherein the housing has at least two housing recesses which are adjacent to one another and which are separated from one another by an intermediate web, each of which housing recesses is configured in such a way that a personalization, by the personalization device, of a part of the document exposed by the respective housing recess is made possible through the housing recesses when the document is located in the operating region.

25. A device for personalizing documents, wherein the device comprises:
a personalization device for applying personalization information to a document to be personalized, the document being located in an operating region of the personalization device, the personalization information being associated with the document to be personalized;
a conveying device which comprises at least two movable document carrier devices, each of which is configured:
to receive the document to be personalized at a transfer position of the device that is the same for each of the at least two movable document carrier devices;
to move the document received, into the operating region of the personalization device for the purpose of being personalized; and
to move the document received, after personalization, back to the transfer position and to discharge it there;
wherein the conveying device is configured, during operation, to convey each of the at least two movable document carrier devices along a respective associated path curve in the shape of a closed loop, wherein a conveying movement of each of the at least two movable document carrier devices along the respective associated path curve is carried out in a temporally staggered manner with respect to the respective conveying movement of others of the at least two movable document carrier devices in the same direction in such a way that the at least two movable document carrier devices do not collide with each other during their respective conveying movements along the respective associated path curve,
wherein at least one of the at least two movable document carrier devices comprises a housing in which there is a cavity to at least partially receive the document, wherein the housing has at least one housing recess which is configured in such a way that a personalization of the document by the personalization device is possible through the at least one housing recess when the document is located in the operating region, and wherein the device for personalizing documents further comprises a hold-down device which is configured to apply temporarily, when one of the at least two movable document carrier devices is located at the transfer position, a guiding force to the document through the at least one housing recess thereof to hold down the document at least in some places while it is being received into, or discharged from, the cavity of the housing.

26. A method of personalizing documents, wherein the method comprises:
   picking up a document to be personalized by one of a plurality of document carrier devices of a device for personalizing documents, wherein the picking up takes place at a transfer position of the device which is the same for each of the plurality of document carrier devices;
   conveying, by a conveying device, the one of the plurality of the document carrier devices with the document picked up into an operating region of a personalization device of the device for the purpose of personalizing the document;
   applying, to the document, when it is located in the operating region of the personalization device, personalization information associated with the document;
   conveying, by the conveying device, the one of the plurality of the document carrier devices with the document picked up back to the transfer position after it has been personalized, to discharge the document there from the one of the plurality of the document carrier devices, while a further one of the plurality of the document carrier devices with a further document picked up is already being conveyed for the purpose of personalizing the further document;

wherein:
   each of the plurality of the document carrier devices is respectively conveyed along a respective associated path curve in the shape of a closed loop;
   the conveying movement of each of the plurality of document carrier devices along the respective associated path curve is carried out in a temporally staggered manner with respect to the respective conveying movement of others of the plurality of document carrier devices in the same direction in such a way that the plurality of document carrier devices do not collide with each other during the course of their respective conveying movements along the respective associated path curve; and
the method further comprises:
   detecting, by a sensor device, at one or more particular points along the respective associated path curves, one or more current movement parameters of each of the plurality of document carrier devices, and communicating the one or more current movement parameters to a control device that controls the device for personalizing documents as a function of the one or more current movement parameters; and
   varying, by the conveying device, the respective associated path curve of at least one of the plurality of document carrier devices as a function of a corresponding control, by the control device, on a basis of the one or more current movement parameters,
wherein each respective associated path curve is defined by a movement path of finite length of one of the plurality of document carrier devices, such that varying of the respective associated path curve changes a movement length or a movement curvature along the movement path of the at least one of the plurality of document carrier devices.

* * * * *